Patented Dec. 12, 1939

2,182,826

UNITED STATES PATENT OFFICE 2,182,826

METHOD FOR THE PREPARATION OF TERPENE ETHERS

Donald H. Sheffield, Brunswick, Ga., assignor to Hercules Powder Company, Wilmington, Del., a corporation of Delaware No Drawing. Application February 15, 1936, Serial No. 64,169

18 Claims. (Cl. 260—611)

This invention relates to a method for the production of ethers of terpene compounds and to the product thereof. More particularly, it relates to a method for the production of terpene ethers by the addition of an alcohol at the double bond of an unsaturated terpene compound.

The ethyl ether of camphene has been produced heretofore by the reaction of ethyl alcohol with the complex cyclic terpene, camphene, in the presence of sulfuric acid as a catalyst. Thus, Semmler (Ber. 33 pp. 3420–32) produced such a compound by boiling a mixture of camphene, ethyl alcohol and sulfuric acid under reflux for several hours. He, likewise, succeeded in producing the ethyl ethers of nopinene and sabinene, but was entirely unsuccessful in producing the ethyl ether of the monocyclic terpene, limonene. Neither polyhydric alcohols, nor monohydric alcohols containing three or more carbon atoms, have been used to produce such ethers heretofore.

Now, I have found that I can produce ethers of complex cyclic or of monocyclic terpene compounds with monohydric alcohols containing more than two carbon atoms. Further, by this method I can produce the lower aliphatic ethers of terpenes which have been known heretofore in much higher yields than obtained heretofore in their production. Likewise, I can produce ethers of terpenes from which ethers could not be produced heretofore, due to the instability of the terpene compound.

The method in accordance with this invention consists of reacting an unsaturated terpene compound with an appropriate alcohol in the presence of a suitable catalyst and at a temperature within the range of about 30° C. to about 60° C. The reaction produced by this method appears to involve the addition of the acid catalyst to a double bond of the unsaturated terpene, to produce an unstable intermediate compound which reacts with the alcohol to produce an ether. Either a mono-ether or a di-ether of the terpene may be produced, as desired, by altering the relative proportions of the reactants and the conditions of the reaction, so that one or two double bonds of the terpene compound reacts. When reacting a polyhydric alcohol, ethers can be produced in which two or more terpene molecules may be linked in one ether molecule.

Suitable catalysts for this reaction include inorganic acids, such as sulfuric acid and phosphoric acid, or the organic substituted inorganic acids of sufur, such as, for example, methyl sulfuric acid, phenol sulfonic acid, benzene sulfonic acid, p-toluene sulfonic acid, etc., as more fully disclosed in the copending application of Irvin W. Humphrey, Serial No. 67,704, dated March 7, 1936.

The concentration of catalyst used in the reaction may be varied over a wide range. Thus, the amount of catalyst used, calculated as sulfuric acid, may be within about the range of 0.1% to 50.0% of the weight of aliphatic alcohol contained in the reaction mixture, and will preferably be within the range of 15% to 25%.

The terpene compound reacted by the method in accordance with this invention may be an unsaturated monocyclic terpene compound such as, for example, dipentene, terpinene, terpinolene, alpha-terpineol, beta-terpineol, or mixtures thereof; it may be an unsaturated complex cyclic terpene capable of isomerization to an unsaturated monocyclic terpene compound, which may be, for example, alpha-pinene; or it may be a bicyclic terpene which is not isomerized under the conditions of the reaction such as, for example, nopinene, camphene and bornylene.

These terpene compounds need not be in the form of pure compounds to be treated in accordance with this invention, but may be reacted in crude form. Thus, in place of the several pure terpene compounds, crude natural mixtures of terpene compounds as, for example, turpentine, pine oil, etc., or mixtures of terpenes with petroleum or other saturated hydrocarbons may be used. Various fractions from these mixtures may also be used without the necessity of isolating the compounds in their pure state.

The alcohol used in this reaction may be a monohydric alcohol such as, for example, methyl alcohol, ethyl alcohol, secondary butyl alcohol, amyl alcohol, ethylene chlorohydrin, tetrahydrofurfuryl alcohol, benzyl alcohol, stearyl alcohol, lauryl alcohol, oleyl alcohol, abietyl alcohol, hydrogenated abietyl alcohol, pimarol, hydropimarol, etc., or mixtures thereof. Alternately, it may be a polyhydric alcohol such as, for example, ethylene glycol, diethylene glycol, glycerol, etc. The alcohol employed in the reaction will preferably be anhydrous, or substantially so.

The relative proportions of the aliphatic alcohol and the terpene compound used in the reaction mixture will depend on the molecular weight of the aliphatic alcohol. To obtain the highest yields of the terpene ether, it is desirable to use not less than one and one-half moles, and preferably at least three moles of the aliphatic alcohol per mole of the terpene compound.

The procedure for the production of aliphatic ethers of the unsaturated monocyclic terpenes in accordance with this invention is illustrated by the following examples:

Example I 2000 grams of dipentene were agitated with 2000 grams of a methanol-acid solution containing 20% sulfuric acid for a period of about five hours and at a temperature of 40-50° C. The reaction was not exothermic but heat had to be added to maintain the temperature. After the period of agitation, the reaction mixture was allowed to separate into two phases. The oily layer was recovered, washed with caustic solution and distilled in vacuo. A yield of 2450 grams was secured, which analyzed 75% terpene ethers and 25% of a mixture of terpinene and dipentene.

Example II 2500 parts by volume of alpha-terpineol was mixed with 1500 parts by volume of a methyl alcohol-sulfuric acid solution containing 15-25% sulfuric acid, to produce a homogeneous solution. This solution was then warmed to 25-40° C. and held at this temperature with agitation for a period of twelve hours. The reaction mixture was then washed with water, and then steam distilled over caustic in vacuo. The steam distilled product was then fractionated to give four fractions, which gave analyses as follows:

First fraction—dipentene, terpinene, terpinolene—yield 10-15%.
Second fraction—terpinyl methyl ether—yield 10-15%.
Third fraction—terpineol (unreacted)—yield 25-30%.
Fourth fraction—1,8-di-methoxymenthane and 1-methoxy menthane-8-old-yield 35-50%. The fourth cut had a specific gravity of 0.955 and a boiling range of 228-245° C. The two ethers were separated by fractionation. The 1,8-di-methoxymenthane boils at 230-232° C. and 1-methoxymethane-8-ol boils at 244-246° C. under atmospheric pressure.

Example III 2000 grams of alphapinene were added to 2000 grams of methanol containing 10% sulfuric acid by weight, while cooling externally with water. The reaction is exothermic, hence the pinene was added at such a rate as would allow a maximum temperature of the reaction mixture of 50° C. Thirty minutes were required for the complete addition of the pinene. The mixture was then agitated for an additional three hours, and the oil layer allowed to separate. This layer was then recovered, washed with caustic soda, and then distilled in vacuo. The yield was about 2400 grams of a crude ether mixture, which was approximately 50% terpinyl methyl ether having a boiling point of 212-214° C. The remaining 50% was a mixture 1,8-dimethoxymenthane boiling at 228-232° C. and bornylmethyl ether boiling at 192-193° C.

Example IV 5000 parts by volume of pure wood turpentine (90-95% alpha-pinene) were added to a mixture of 2400 parts methanol and 500 parts 93-95% sulfuric acid. The mixture was then agitated and warmed to 35° C. to start the reaction, which is exothermic due to the isomerization of the bicyclic alpha-pinene to a mono-cyclic terpinyl form. The temperature of the reaction mixture was held by cooling to a maximum of 45° C., with continued agitation for a period of about three hours. The oily layer was then allowed to separate and removed from the reaction mixture. It was then washed with water and fractionated over caustic in vacuo. Fractionation of this crude product gave two cuts. One of these fractions was composed of a mixture of dipentene, terpinene, terpinolene, and made up about 30% of the yield on the basis of the original turpentine. The other fraction was a mixture of terpene ethers including terpinylmethyl ether, 1,8-dimethoxymenthane and bornylmethyl ether.

Example V

A mixture of isopropyl terpene ethers was prepared from wood turpentine following the procedure of Example IV, except with the substitution of 3500 parts of isopropyl alcohol for the 2400 parts of methanol used in that example. Due to the solubility of the isopropyl alcohol in the reaction product, it is convenient to separate the unreacted excess from the reaction mixture by washing with water. Fractionation of the oil phase of the reaction mixture yields some isopropyl alcohol, a mixture of dipentene, terpinene and terpinolene, and a mixture of isopropyl terpene ethers. The mixture of ethers was obtained in yields of about 50% on the basis of the original turpentine. It had a specific gravity of about 0.918 and a boiling range of 200-216 C.

Example VI 500 cc. of alpha-pinene, 500 cc. of butyl alcohol and 25 cc. of methyl sulfuric acid were agitated at 40-60° C. for five hours. The product was then washed with water and then distilled over caustic in vacuo to obtain the following fractions:

(A) Butyl alcohol.
(B) Dipentene, terpinene, terpinolene mixture.
(C) Terpinylbutyl ether cut (300 cc.) B. P. 230-250° C.
(D) A small residue of about 5%.

Example VII 100 grams of methanol, 10 cc. of phenolsulfonic acid and 1000 cc. of dipentene were refluxed for a period of 7 hours. The mixture was then cooled, the oily layer separated and washed with water. The oily layer was then fractionated over caustic in vacuo to obtain the following fractions:

(A) A mixture of dipentene, terpinene, terpinolene.
(B) Terpinylmethyl ether containing a small amount of 1,8-di-methoxy menthane. The yield of this fraction was 90% on the basis of the dipentene used.

It will be understood that the details and examples hereinbefore set forth are illustrative only, and that the invention herein broadly described and claimed is in no way limited thereby.

The aliphatic ethers of terpene compounds produced in accordance with this invention are useful as solvents and plasticizers in protective coatings and in printing inks.

No claim is made herein for a process involving the use of an organic substituted inorganic acid as catalyst for the production of terpene ethers, since such forms the subject of the copending application of Irvin W. Humphrey, Serial No. 67,704, filed March 7, 1936.

What I claim and desire to protect by Letters Patent is:

1. A terpene ether derived from an unsaturated terpene compound by the addition of a monohydric alcohol containing not less than three carbon atoms to a double bond of the unsaturated terpene compound.

2. A terpene ether produced by the reaction of an unsaturated terpene compound with a monohydric alcohol containing not less than three carbon atoms.

3. A terpene ether produced by the reaction of an unsaturated terpene hydrocarbon with a monohydric alcohol containing not less than three carbon atoms.

4. A terpene ether produced by the reaction of an unsaturated monocyclic terpene compound with a monohydric alcohol containing not less than three carbon atoms.

5. A terpene ether produced by the reaction of an unsaturated complex cyclic terpene compound with a monohydric alcohol containing not less than three carbon atoms.

6. A terpene ether produced by the reaction of alpha-pinene with a monohydric alcohol containing not less than three carbon atoms.

7. A terpene ether produced by the reaction of alpha-terpineol with a monohydric alcohol containing not less than three carbon atoms.

8. A terpene ether produced by the reaction of dipentene with a monohydric alcohol containing not less than three carbon atoms.

9. A terpene ether produced by the reaction of alpha-pinene with butyl alcohol.

10. The method of producing a terpene ether which includes reacting an unsaturated terpene compound with an alcohol in the presence of an acid catalyst at a temperature within the range of about 30° C. to about 60° C.

11. The method of producing a terpene ether which includes reacting an unsaturated terpene compound with a monohydric alcohol in the presence of an acid catalyst at a temperature within the range of about 30° C. to about 60° C.

12. The method of producing a terpene ether which includes reacting an unsaturated terpene hydrocarbon with an alcohol in the presence of an acid catalyst at a temperature within the range of about 30° C. to about 60° C.

13. The method of producing an ether of an unsaturated terpene compound which includes reacting an unsaturated terpene compound with an alcohol in the presence of sulfuric acid at a temperature within the range of about 30° C. to about 60° C.

14. A terpene ether produced by the reaction of a monohydric alcohol containing not less than three carbon atoms at a double bond of an unsaturated terpene hydrocarbon.

15. A terpene ether produced by the reaction of a monohydric alcohol containing not less than three carbon atoms at a double bond of an unsaturated terpene alcohol.

16. A terpene ether produced by the reaction of a monohydric alcohol containing not less than three carbon atoms at a double bond of an alpha pinene.

17. A terpene ether produced by the reaction of a monohydric alcohol containing not less than three carbon atoms at a double bond of an alpha terpineol.

18. A terpene ether produced by the reaction of a monohydric alcohol containing not less than three carbon atoms at a double bond of dipentene.

DONALD H. SHEFFIELD.